(12) United States Patent
Gao et al.

(10) Patent No.: US 12,557,040 B2
(45) Date of Patent: Feb. 17, 2026

(54) METHOD, DEVICE AND COMPUTER READABLE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 581 days.

(21) Appl. No.: 17/998,617

(22) PCT Filed: May 13, 2020

(86) PCT No.: PCT/CN2020/090020
§ 371 (c)(1),
(2) Date: Nov. 11, 2022

(87) PCT Pub. No.: WO2021/226874
PCT Pub. Date: Nov. 18, 2021

(65) Prior Publication Data
US 2023/0232343 A1  Jul. 20, 2023

(51) Int. Cl.
*H04W 72/02* (2009.01)
*H04W 52/32* (2009.01)
*H04W 52/36* (2009.01)

(52) U.S. Cl.
CPC ....... *H04W 52/367* (2013.01); *H04W 52/325* (2013.01)

(58) Field of Classification Search
CPC .. H04L 5/0096; H04L 5/0048; H04W 52/367; H04W 52/325
See application file for complete search history.

(56) References Cited

U.S. PATENT DOCUMENTS

2018/0092073 A1  3/2018  Nogami et al.
2020/0313816 A1*  10/2020  Sun ...................... H04L 27/2607

FOREIGN PATENT DOCUMENTS

| CN | 110650001 A | 1/2020 |
| WO | 2019/029823 A1 | 2/2019 |
| WO | 2019/096316 A1 | 5/2019 |

OTHER PUBLICATIONS

CMCC, "Consideration on flexible SRS configuration and transmission for NR", 3GPP TSG RAN WG1 #87 R1-1612185, Oct. 14-18, 2016, pp. 1-4.

(Continued)

*Primary Examiner* — Anez C Ebrahim
(74) *Attorney, Agent, or Firm* — Sughrue Mion, PLLC

(57) ABSTRACT

Embodiments of the present disclosure relate to methods, devices and computer readable media for communication of a RS. A method of communication comprises receiving, at a terminal device and from a network device, first information triggering a first communication of a reference signal in a first uplink resource, the first communication being triggered later than a second communication of the reference signal in a second uplink resource; determining, based on a modification result, power adjustment information for the first communication, the modification result indicating whether the second uplink resource is modified; and performing the first communication based on the power adjustment information. Embodiments of the present disclosure can ensure a correct power control for RS communication, and can achieve a dynamic adjustment for a RS communication while considering both flexibility of RS triggering and its related overhead.

12 Claims, 6 Drawing Sheets

(56) References Cited

OTHER PUBLICATIONS

International Search Report for PCT/CN2020/090020 dated Feb. 18, 2021.
Written Opinion for PCT/CN2020/090020 dated Feb. 18, 2021.

\* cited by examiner

METHOD, DEVICE AND COMPUTER READABLE MEDIUM FOR COMMUNICATION

TECHNICAL FIELD

Embodiments of the present disclosure generally relate to the field of telecommunication, and in particular, to methods, devices and computer storage media for communication of a reference signal (RS).

BACKGROUND

In recent study on a new radio (NR) technology, it is agreed that enhancements on aperiodic sounding reference signal (SRS) triggering are critical to facilitate more flexible triggering and downlink control information (DCI) overhead or usage reduction. In this event, it has been proposed to allow a dynamic adjustment of SRS triggering slot offset. That is, a SRS transmission is allowed to be dynamically adjusted.

Such dynamic adjustment may cause many issues. For example, as current transmission power control (TPC) command duration is counted from a physical downlink control channel (PDCCH) triggering of previous SRS transmission (not included) until a PDCCH triggering of current SRS transmission (included), the dynamic adjustment of the SRS transmission may cause an incorrect count for TPC command duration. In addition, how to perform the dynamic adjustment and how to ensure the robust of the communication are also highly concerned. Thus, there is a need for an improved solution to solve the issues related to the dynamic adjustment.

SUMMARY

In general, embodiments of the present disclosure provide methods, devices and computer storage media for communication of a RS.

In a first aspect, there is provided a method of communication. The method comprises: receiving, at a terminal device and from a network device, first information triggering a first communication of a reference signal in a first uplink resource, the first communication being triggered later than a second communication of the reference signal in a second uplink resource; determining, based on a modification result, power adjustment information for the first communication, the modification result indicating whether the second uplink resource is modified; and performing the first communication based on the power adjustment information.

In a second aspect, there is provided a terminal device. The terminal device comprises a processor and a memory coupled to the processor. The memory stores instructions that when executed by the processor, cause the terminal device to perform the method according to the first aspect of the present disclosure.

In a third aspect, there is provided a computer readable medium having instructions stored thereon. The instructions, when executed on at least one processor, cause the at least one processor to perform the method according to the first aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
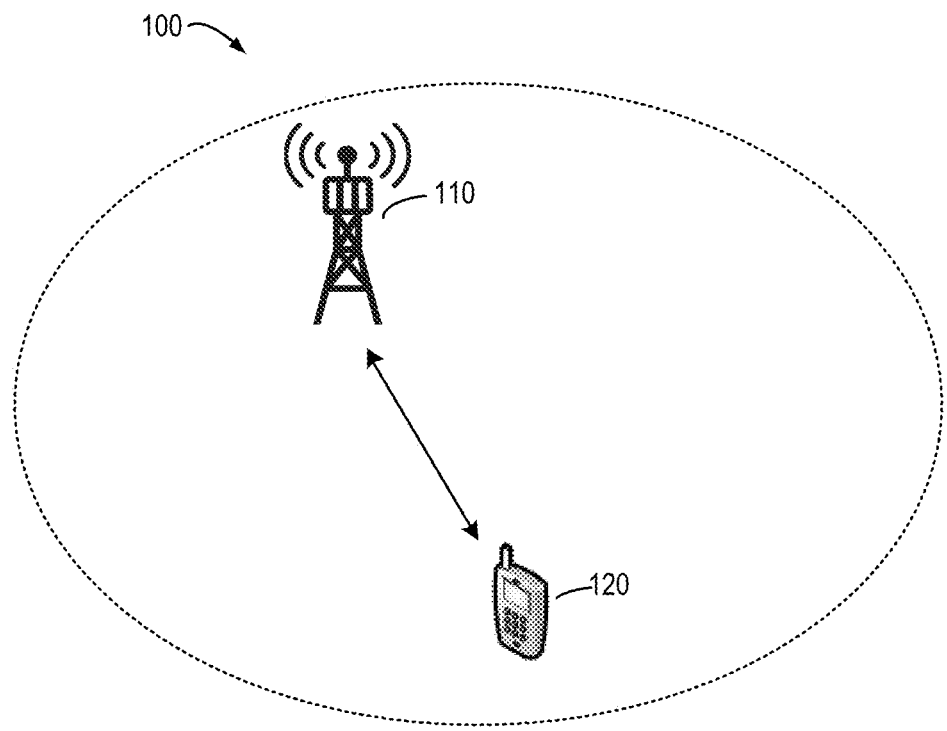
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

In current SRS design in NR, a slot offset for aperiodic SRS triggering is semi-statically configured by a higher layer parameter. For codebook, non-codebook or antenna-switching based transmissions, only one aperiodic SRS resource set for each of these transmissions is supported, and thus only one slot offset is allowed for each of these transmissions. However, due to variation of a slot format configuration, especially for dynamic slot changing by DCI format 2_0, the slot offset configured for the aperiodic SRS resource may be unavailable in some cases. Thus, a dynamic adjustment on a SRS transmission is proposed, and its related issues arise.

As mentioned above, as current TPC command duration is counted from a PDCCH triggering of previous SRS transmission (not included) until a PDCCH triggering of current SRS transmission (included), or alternatively, current TPC command (For example, the TPC command is configured with accumulated type) is summed or accumulated from the last symbol of a PDCCH triggering of a previous SRS transmission (the last symbol is not included) until the last symbol of a PDCCH triggering of current SRS transmission (the last symbol is included), where the last symbol of the PDCCH triggering of the previous SRS transmission is earlier than the last symbol of the PDCCH triggering of the current SRS transmission, the dynamic adjustment of the SRS transmission may cause an incorrect count for TPC command duration. In addition, how to perform the dynamic adjustment and how to ensure the robust of the communication are also highly concerned.

In view of the above, embodiments of the present disclosure provide an improved solution of communication of a RS. According to an aspect of embodiments of the present disclosure, power adjustment information (for example, TPC command duration) for current RS communication is determined based on a modification result indicating whether previous RS communication is modified, and the current RS communication is performed based on the determined power control information. In this way, a suitable power control for the current RS communication can be achieved, and a robust communication can be enhanced.

According to another aspect of embodiments of the present disclosure, when a communication of a RS in an uplink resource is triggered, whether a modification is performed on the uplink resource is determined based on availability of a slot configured for the uplink resource and/or flexibility requirement for the RS triggering and communication. In this way, a dynamic adjustment for a RS communication can be achieved, and a robust communication can be enhanced. Principles and implementations of the present disclosure will be described in detail below with reference to the figures.

According to embodiments of the present disclosure, a network device and a terminal device may communicate with each other based on time slots (or slots for short) as defined in the 3GPP specifications. For example, for subcarrier spacing configuration μ, slots are numbered $$n_s^\mu \in \{0, \ldots, N_{slot}^{subframe,\mu} - 1\}$$

in an increasing order within a subframe and $$n_{s,f}^\mu \in \{0, \ldots, N_{slot}^{frame,\mu} - 1\}$$

in an increasing order within a frame. There are $$N_{symb}^{slot}$$

consecutive Orthogonal Frequency Division Multiplexing (OFDM) symbols in a slot where $N_{symb}^{slot}$ depends on the cyclic prefix as given in related 3GPP specifications (TS 38.211), as shown in Table 1 and Table 2 below. The start of slot $$n_s^\mu$$

in a subframe is aligned in time with the start of OFDM symbol $$n_s^\mu N_{symb}^{slot}$$

in the same subframe. Other related definitions and information of slots can be found in existing or future 3GPP specifications. More generally, the term slot as used herein can refer to any existing defined unit of time or any unit of time to be defined in the future.

TABLE 1

Number of OFDM symbols per slot, slots per frame, and slots per subframe for normal cyclic prefix.

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

Number of OFDM symbols per slot, slots per frame, and slots per subframe for extended cyclic prefix.

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the network device 110 and the terminal device 120 may communicate with each other via downlink and uplink channels such as wireless communication downlink and uplink channels. For example, communication of a RS may be performed between the network device 110 and the terminal device 120. In some embodiments, the network device 110 may transmit a downlink RS to the terminal device 120 for at least one of channel evaluation/estimation, channel characteristic estimation and compensation, phase noise estimation, time and/or frequency tracking and associated demodulation of downlink transmission, and the terminal device 120 may correspondingly receive the downlink RS. For example, the downlink RS may be any one or more of a demodulation reference signal (DMRS), a cell reference signal (CRS), a multicast broadcast single frequency network (MBSFN) reference signal, a positioning reference signal (PRS), a fine time/frequency tracking reference signal (TRS), a phase tracking reference signal (PTRS) and a channel state information-reference signal (CSI-RS). It should be note that the reference signal may be any downlink RS existing in the art or to be developed in the future.

In some alternative embodiments, the terminal device 120 may transmit a RS (i.e., an uplink RS) to the network device 110 for at least one of channel evaluation/estimation, channel characteristic estimation and compensation, phase noise estimation, time and/or frequency tracking, channel estimation for downlink channel, and associated modulation of uplink transmission, and the network device 110 may correspondingly receive the uplink RS. For example, the RS may be any one or more of a sounding reference signal (SRS), a demodulation reference signal (DMRS), a positioning reference signal (PRS), a fine time/frequency tracking reference signal (TRS) and a phase tracking reference signal (PTRS). It should be note that the reference signal may be any uplink RS existing in the art or to be developed in the future.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
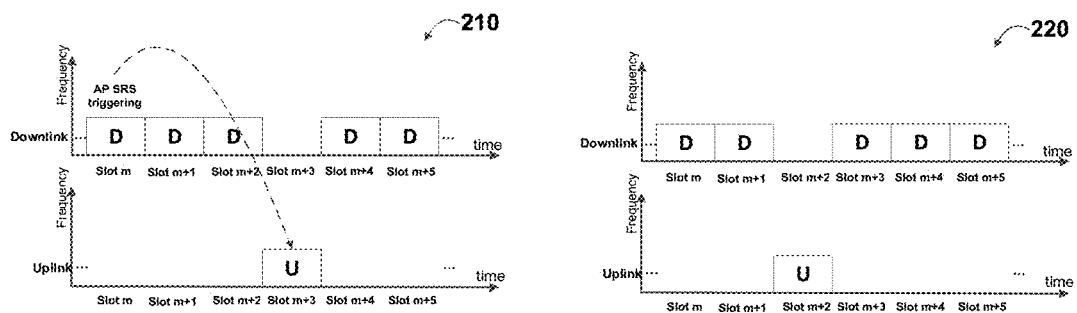
FIG. 2 illustrates a schematic diagram illustrating a possible failure of communication of a RS in a current RS triggering scheme.

As mentioned above, due to variation of a slot format configuration, especially for dynamic slot changing by DCI format 2_0, a slot offset configured for an aperiodic RS resource may be unavailable in some cases. FIG. 2 illustrates a schematic diagram illustrating a possible failure of communication of a RS in a current RS triggering scheme. In this example, SRS is taken as an example of a RS for illustration.

Reference sign 210 shows the case of suitable offset for the aperiodic SRS resource, and reference sign 220 shows the case of unsuitable offset for the aperiodic SRS resource. As shown by reference sign 210, slots m, m+1, m+2, m+4 and m+5 are configured for downlink transmission (denoted as D in FIG. 2) and slots m+3 is configured for uplink transmission (denoted as U in FIG. 2) according to current slot format configuration. Assuming that an offset value of 3 is configured for SRS transmission. When information triggering SRS transmission is received by the terminal device 120 in slot m, a terminal device may transmit SRS in slot n+3 via an uplink transmission. However, when the slot format configuration is varied, for example, as shown by reference sign 220, slots m, m+1, m+3, m+4 and m+5 are configured for downlink transmission and slots m+2 is configured for uplink transmission, there is no slot suitable for triggering SRS transmission with slot offset 3. In addition, as shown in reference sign 210, only slot m is suitable for aperiodic SRS triggering, as the configured slot offset is 3 in this example, which may restrict the flexibility.

In addition, in current RS design in NR, the slot offset may be ranged from 0 to 32. For the most flexible case, all available slot offset values are indicated by DCI. In this case, 6 bits will be needed for transmission of the DCI, and thus a large DCI overhead will be caused.

Figure 3:
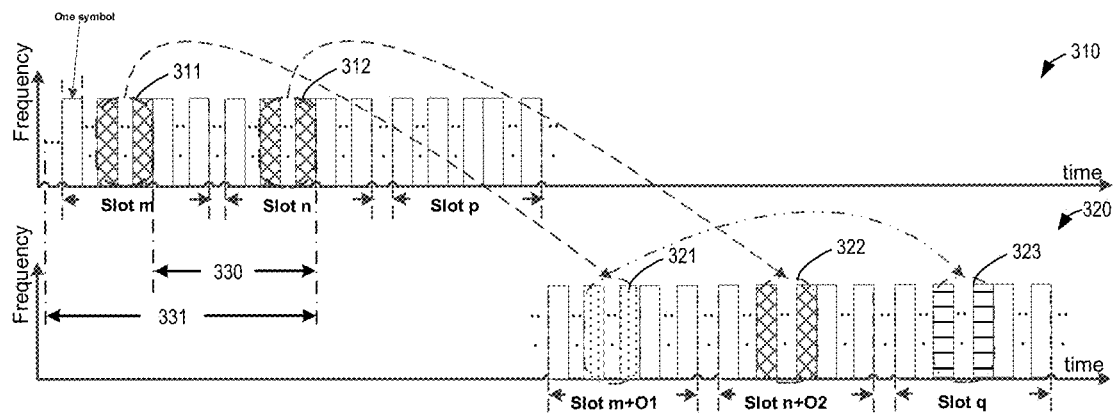
FIG. 3 illustrates a schematic time-frequency diagram illustrating an incorrect TPC command duration caused by an adjustment of communication of a RS.

In view of the above, a dynamic adjustment for a RS communication is proposed. However, such dynamic adjustment may cause an incorrect power control for current RS communication. FIG. 3 illustrates a schematic time-frequency diagram illustrating an incorrect TPC command duration caused by an adjustment of communication of a RS. As shown in FIG. 3, reference sign 310 shows the case of a downlink, and reference sign 320 shows the case of an uplink. Reference sign 311 shows a first downlink control channel such as a PDCCH triggering a previous AP RS, the first downlink control channel being in slot m, m is an integer. For example, $0 \leq m \leq 159$. For another example, $0 \leq m \leq 2559$. According to the configured offset in RRC (for example, O1, and O1 is an integer. For example, $0 \leq O1 \leq 32$. For another example, $0 \leq O1 \leq 256$), the previous AP RS will be communicated in slot m+O1 as denoted by 321. Reference sign 312 shows a second downlink control channel such as a PDCCH triggering a current AP RS, the second downlink control channel being in slot n, n is an integer. For example, $0 \leq n \leq 159$. For another example, $0 \leq n \leq 2559$. According to the configured offset in RRC (for example, O2, and O2 is an integer. For example, $0 \leq O2 \leq 32$. For another example, $0 \leq O2 \leq 256$), the current AP RS will be communicated in slot n+O2 as denoted by 322.

In some embodiments, the value of O1 may be same with the value of O2. In some embodiments, the value of O1 may be different from the value of O2. In some embodiments, m may be same with n, or alternatively, slot m and slot n are the same slot. For example, the PDCCH triggering the previous AP RS is in the same slot with the PDCCH triggering the current AP RS. For another example, the last symbol of the PDCCH triggering the previous AP RS is earlier than or no later than the last symbol of the PDCCH triggering the current AP RS. In some embodiments, m may be different with n, or alternatively, slot m and slot n are different slots. For example, the slot for the PDCCH triggering the previous AP RS is different from the slot for the PDCCH triggering the current AP RS. For another example, the slot for the PDCCH triggering the previous AP RS is earlier than or no later than the slot for the PDCCH triggering the current AP RS. In some embodiments, n+O2 may be different from q. For example, slot n+O2 is earlier than or no later than slot q.

In some embodiments, n+O2 may be same with q, or in other words, slot n+O2 is same with slot q. For example, the previous AP RS transmission is later than or no earlier than the current AP RS transmission. For another example, the first and/or the last symbol of the previous AP RS transmission is later than or no later than the first and/or the last symbol of the current AP RS transmission. In some embodiments, m+O1 may be same with n+O2, or alternatively, the slot m+O1 and the slot n+O2 are same slot. For example, the configured timing for the previous AP RS transmission is earlier than or no later than the configured timing for the current AP RS transmission. For another example, the configured timing of the first and/or the last symbol of the previous AP RS transmission is earlier than or no later than the configured timing of the first and/or the last symbol of the current AP RS transmission.

In some embodiments, m+O1 may be different from n+O2, or alternatively, the slot m+O1 is different from the slot n+O2. For example, the configured slot m+O1 for the previous AP RS transmission is earlier than or no later than the configured slot n+O2 for the current AP RS transmission. In some embodiments, the slot m+O1 is unavailable for the previous AP RS communication and the previous AP RS is adjusted to be communicated in slot q as denoted by 323. In some embodiments, the previous AP RS may be flexibly or dynamically adjusted to be communicated in slot q as denoted by 323. For example, the previous AP RS may be needed to be delayed. It should be noted that the previous AP RS communication may be delayed or advanced.

In some embodiments, the network device 110 may transmit or indicate or configure a TPC command to the terminal device. In some embodiments, the network device may trigger or indicate or configure an AP RS communication to the terminal device. For example, the terminal device may transmit the AP RS to the network device. For another example, the network device may transmit the AP RS to the terminal device. In some embodiments, the TPC command is used for the power adjustment for the AP RS communication.

Generally, previous RS communication occasion (for example, previous SRS transmission occasion) is first determined, and then a downlink control channel (for example, a PDCCH) triggering the previous RS communication is determined. Then TPC command duration is counted or summed or accumulated from a PDCCH triggering the previous RS communication to a PDCCH triggering the current RS communication. In this example, in case that the current RS communication is performed in the slot m+O1, the TPC command duration is from the first downlink control channel 311 to the second downlink control channel 312, as denoted by 330.

According to the above process, in case that the current RS communication is adjusted to be performed in the slot q, another RS communication in a slot (not shown) earlier than the slot m+O1 is determined, and another PDCCH (not shown) triggering the other RS communication is determined for count or summation or accumulation of the TPC command duration, the other PDCCH being in a slot earlier than the slot m. The TPC command duration is from the other PDCCH to the second downlink control channel 312, as denoted by 331. In this case, the TPC command duration is changed. A terminal device will determine a power for the current communication based on the TPC command duration 331. However, a network device adjusts a power for the current communication based on TPC command duration 330. This will cause incorrect power control.

According to an aspect of embodiments of the present disclosure, power adjustment information (for example, TPC command duration) for current RS communication is determined based on a modification result indicating whether previous RS communication is modified, and the current RS communication is performed based on the determined power adjustment information. According to another aspect of embodiments of the present disclosure, when a communication of a RS in an uplink resource is triggered, whether a modification is performed on the uplink resource is determined based on availability of a slot configured for the uplink resource or the flexible/dynamic need for the RS communication. In this way, at least part of the related issues about the dynamic adjustment of RS communication can be solved. It will be described with reference to FIG. 4.

Figure 4:
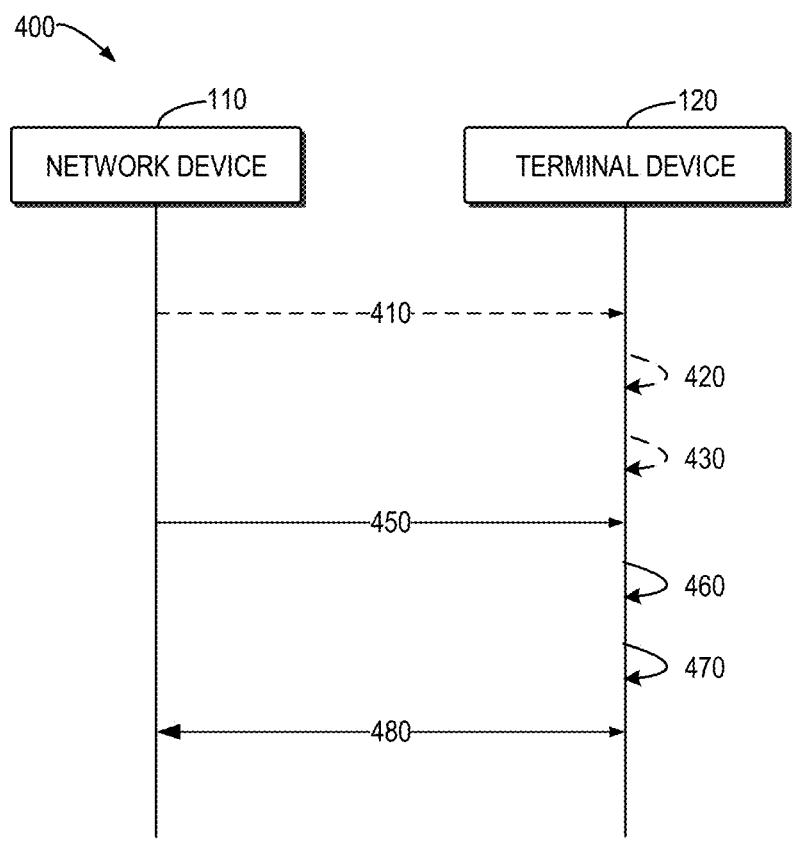
FIG. 4 illustrates a schematic diagram illustrating a process for communication of a RS according to embodiments of the present disclosure.

FIG. 4 shows a schematic diagram illustrating a process 400 for communication of a RS according to embodiments of the present disclosure. For the purpose of discussion, the process 400 will be described with reference to FIG. 1. The process 400 may involve the network device 110 and the terminal device 120 as illustrated in FIG. 1.

As shown in FIG. 4, the network device 110 may transmit 410 information (also referred to as second information herein) triggering a communication (also referred to be a second communication or a previous communication herein) of a RS in an uplink resource (also referred to as a second uplink resource herein). In some embodiments, the second information may be at least one of MAC-CE and DCI. It should be noted that other suitable ways are also feasible.

Upon receiving the second information, the terminal device 120 may determine 420 whether a slot configured for the second uplink resource is available. If determining that the slot is unavailable, the terminal device 120 may modify 430 the second uplink resource. In some embodiments, the terminal device 120 may move the second uplink resource to next available slot. In some embodiments, the terminal device 120 may receive information (also referred to be third information herein) about the modification and modify the second uplink resource based on the information. For example, the third information may comprise a slot offset value for replacement of the configured slot offset value. Alternatively, the third information may comprise an offset value with respect to the configured slot offset value. It will be described in details later with reference to Embodiment 2. In this way, the second communication can be dynamically adjusted, and a robust communication can be achieved.

In some embodiments, the resource or the slot is regarded as available if there are available uplink symbol(s) for the configured time-domain location(s) in the resource or in the slot for all the RS resources (in a resource set) and/or if the resource or the slot satisfies the minimum timing requirement between the triggering information and all the RS resources (in the resource set).

The network device 110 may further transmit 450 another information (also referred to as first information herein) triggering another communication (also referred to as a first communication or a current communication herein) of the RS in another uplink resource (also referred to as a first uplink resource). In some embodiments, the first information may be transmitted in a first slot later than a second slot for the second information. That is, the first communication is triggered later than the second communication.

Upon receiving the first information, the terminal device 120 may determine 460 whether the second uplink resource is modified, i.e., whether previous communication (in this example, the second communication) of the RS is adjusted. Based on a result of the determination, the terminal device 120 may determine 470 power adjustment information for the first communication. In some embodiments where the previous communication is not modified, the TPC command duration may be determined based on the original way. If the previous communication is modified, the TPC command duration may be determined based on a different way. It will be described in details later with reference to Embodiment 1.

Upon determining power control information, the terminal device 120 may perform 480 the first communication with the network device 110 based on the power control information. In some embodiments, the terminal device 120 may adjust a power for the first communication based on the power control information, and then perform transmission or reception of the RS. In this way, a correct TPC command duration can be ensured, and a suitable power control for the first communication can be achieved.

Corresponding to the process described in FIG. 4, embodiments of the present disclosure provide methods of communication implemented at a terminal device. These methods will be described below in Embodiment 1 and Embodiment 2 with reference to FIGS. 5-11.

Embodiment 1

Figure 5:
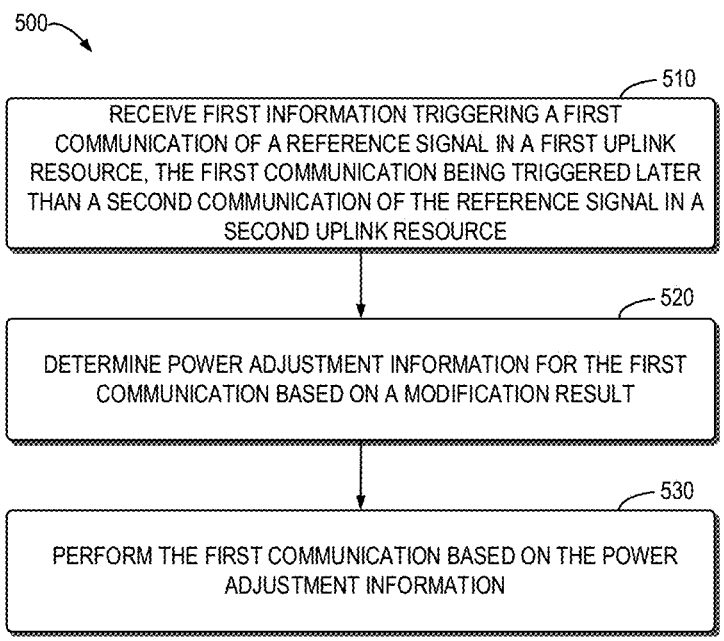
FIG. 5 illustrates an example method of communication implemented at a terminal device in accordance with some embodiments of the present disclosure.

In this embodiment, a description is made on a power control for current RS communication upon an adjustment of previous RS communication. FIG. 5 illustrates an example method 500 of communication implemented at a terminal device in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

At block 510, the terminal device 120 receives first information triggering a first communication of a RS in a first uplink resource. In some embodiments, the first communication is triggered later than a second communication of the RS in a second uplink resource. In some embodiments, the RS may be a downlink RS. For example, the RS may be any one or more of a DMRS, a CRS, a MBSFN RS, a PRS, a TRS, a PTRS and a CSI-RS. In some alternative embodiments, the RS may be an uplink RS. For example, the RS may be any one or more of a SRS, a DMRS, a PRS, a TRS and a PTRS. It should be noted that the RS may be any downlink or uplink reference signal existing in the art or to be developed in the future.

At block 520, the terminal device 120 determines power adjustment information for the first communication based on a modification result. The modification result indicates whether the second uplink resource is modified. For example, the terminal device 120 may determine whether the second uplink resource is modified. If determining that the second uplink resource is not modified, the terminal device 120 may determine the power adjustment information for the first communication based on the original way. In some embodiments, the power adjustment information may be a TPC command duration. It should be noted that the power adjustment information may be other suitable parameters for power adjustment. In some embodiments, the terminal device 120 may determine a TPC command duration based on an actual occasion or slot of the second communication.

If determining that the second uplink resource is modified, the terminal device 120 may determine power adjustment information for the first communication based on a different way from the original way. It will be described in details with reference to Examples 1-4.

Example 1

In some embodiments, the terminal device 120 may determine a time duration (for example, TPC command duration) based on the second uplink resource and the first uplink resource, and determine the power adjustment information based on the time duration. For example, slots configured for the first and second uplink resources can be determined, downlink control channels triggering the first and second communications can be determined from the slots, and then the time duration can be determined by the determined downlink control channels. In this case, the originally configured RS communication occasion and its triggering downlink control channel are still used for timing for TPC command duration, and thus the original duration for TPC command is maintained. It will be further described with reference to FIG. 6.

Figure 6:
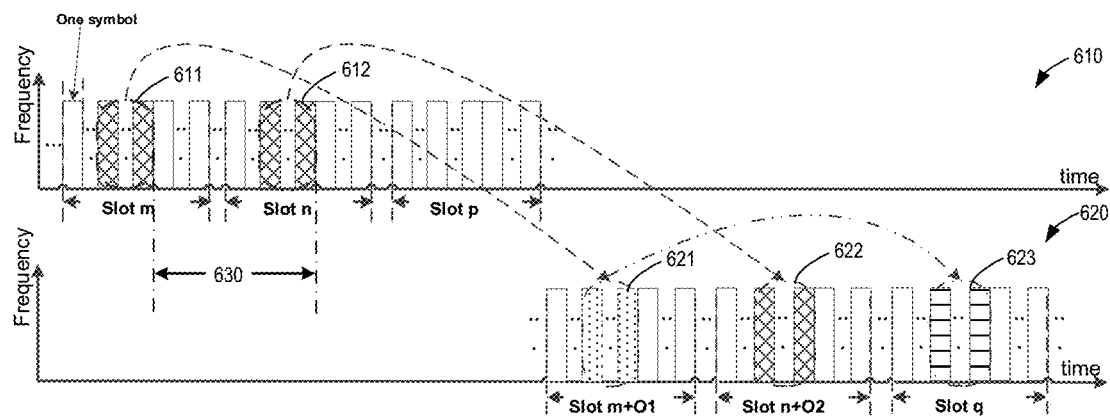
FIG. 6 illustrates a schematic time-frequency diagram illustrating a determination of a TPC command duration according to some embodiments of the present disclosure.

FIG. 6 illustrates a schematic time-frequency diagram illustrating a determination of a TPC command duration according to some embodiments of the present disclosure. As shown in FIG. 6, reference sign 610 shows the case of a downlink, and reference sign 620 shows the case of an uplink. Reference sign 611 shows a first downlink control channel such as a PDCCH triggering a previous AP RS, the first downlink control channel being in slot m, m is an integer. For example, 0≤m≤159. For another example, 0≤m≤2559. According to the configured offset in RRC (for example, O1, and O1 is an integer. For example, 0≤O1≤32. For another example, 0≤O1≤256), the previous AP RS will be communicated in slot m+O1 as denoted by 621. Reference sign 612 shows a second downlink control channel such as a PDCCH triggering a current AP RS, the second downlink control channel being in slot n, n is an integer. For example, 0≤n≤159. For another example, 0≤n≤2559. According to the configured offset in RRC (for example, O2, and O2 is an integer. For example, 0≤O2≤32. For another example, 0≤O2≤256), the current AP RS will be communicated in slot n+O2 as denoted by 622.

In some embodiments, the value of O1 may be same with the value of O2. In some embodiments, the value of O1 may be different from the value of O2. In some embodiments, m may be same with n, or alternatively, slot m and slot n are the same slot. For example, the PDCCH triggering the previous AP RS is in the same slot with the PDCCH triggering the current AP RS. For another example, the last symbol of the PDCCH triggering the previous AP RS is earlier than or no later than the last symbol of the PDCCH triggering the current AP RS. In some embodiments, m may be different with n, or alternatively, slot m and slot n are different slots. For example, the slot for the PDCCH triggering the previous AP RS is different from the slot for the PDCCH triggering the current AP RS. For another example, the slot for the PDCCH triggering the previous AP RS is earlier than or no later than the slot for the PDCCH triggering the current AP RS.

In some embodiments, n+O2 may be different from q. For example, slot n+O2 is earlier than or no later than slot q. In some embodiments, n+O2 may be same with q, or in other words, slot n+O2 is same with slot q. For example, the previous AP RS transmission is later than or no earlier than the current AP RS transmission. For another example, the first and/or the last symbol of the previous AP RS transmission is later than or no later than the first and/or the last symbol of the current AP RS transmission. In some embodiments, m+O1 may be same with n+O2, or alternatively, the slot m+O1 and the slot n+O2 are same slot. For example, the configured timing for the previous AP RS transmission is earlier than or no later than the configured timing for the current AP RS transmission. For another example, the configured timing of the first and/or the last symbol of the previous AP RS transmission is earlier than or no later than the configured timing of the first and/or the last symbol of the current AP RS transmission.

In some embodiments, m+O1 may be different from n+O2, or alternatively, the slot m+O1 is different from the slot n+O2. For example, the configured slot m+O1 for the previous AP RS transmission is earlier than or no later than the configured slot n+O2 for the current AP RS transmission. In some embodiments, the slot m+O1 is unavailable and the previous AP RS is adjusted to be communicated in slot q as denoted by 623. In some embodiments, the previous AP RS may be flexibly or dynamically adjusted to be communicated in slot q as denoted by 323. For example, the previous AP RS may be needed to be delayed. It should be noted that the previous AP RS communication may be delayed or advanced.

In this example, the slot m+O1 configured for the second uplink resource and the slot n+O2 configured for the first uplink resource is used for determination of the TPC command duration, and thus the original TPC command duration can be determined as denoted by 630. For example, the TPC command duration is between the next symbol starting from the last symbol of the PDCCH for triggering the AP RS in slot m+O1 and the last symbol of the PDCCH for triggering the AP RS in slot n+O2.

Example 2

In some embodiments, the terminal device 120 may determine a time duration based on a second downlink resource triggering the second communication and a later one of a first downlink resource triggering the first communication and a third downlink resource triggering the modification in a slot, and determine the power adjustment information based on the time duration. For example, the starting timing for TPC command duration may be based on a PDCCH for triggering the previous communication occasion (for example, the next symbol starting from the last symbol of the PDCCH for triggering the previous communication occasion, i.e., the originally configured slot before modification), and the ending timing may be based on the later one of a PDCCH for triggering the current communication occasion and a PDCCH for slot offset modification (for example, the last symbol of the latter one of the PDCCH for triggering the current communication occasion and the PDCCH for slot offset modification).

In some embodiments where the slot or the first or last symbol of the PDCCH for slot offset modification is not later than the slot or the first or last symbol of the PDCCH for triggering the current communication, the starting timing for TPC command duration may be based on the PDCCH for triggering the previous communication occasion (for example, the next symbol starting from the last symbol of the PDCCH for triggering the previous communication occasion), and the ending timing may be based on the PDCCH for triggering the current communication occasion (for example, the last symbol of the PDCCH for triggering the current communication occasion). With reference to FIG. 6, for example, a PDCCH for slot offset modification is same with the PDCCH triggering the current communication as denoted by 612, and thus the TPC command duration will be determined as denoted by 630. In this way, the original TPC command duration is maintained. For example, the TPC command duration is between the next symbol starting from the last symbol of the PDCCH in slot m (for triggering the AP RS in slot m+O1) and the last symbol of the PDCCH in slot n (for triggering the AP RS in slot n+O2).

Figure 7:
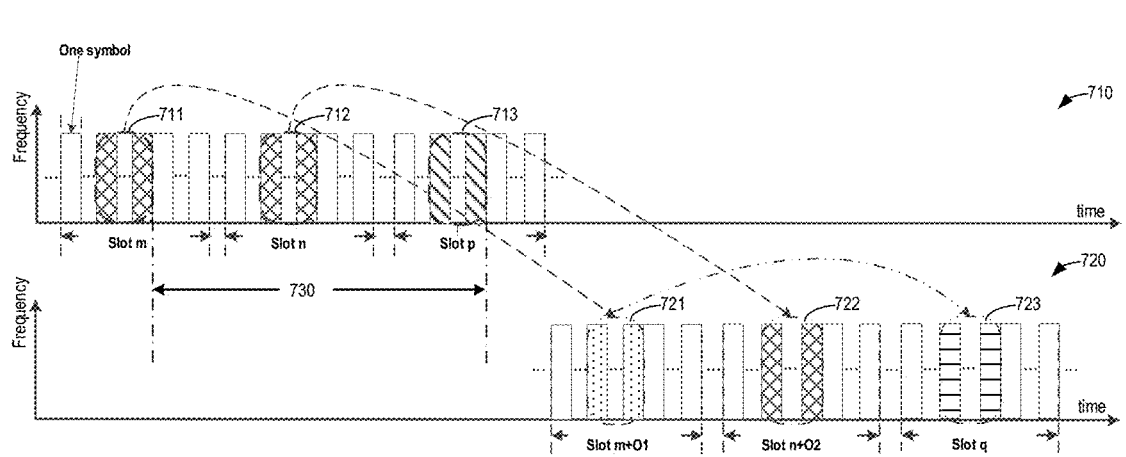
FIG. 7 illustrates a schematic time-frequency diagram illustrating another determination of a TPC command duration according to some embodiments of the present disclosure.

In some embodiments where the slot or the first or last symbol of the PDCCH for slot offset modification is later than or no earlier than the slot or the first or last symbol of the PDCCH for triggering the current communication, the starting timing for TPC command duration may be based on the PDCCH for triggering the previous communication occasion (for example, the next symbol starting from the last symbol of the PDCCH for triggering the previous communication occasion), and the ending timing may be based on the PDCCH for slot offset modification (for example, the last symbol of the PDCCH for slot modification). It will be described with reference to FIG. 7. FIG. 7 illustrates a schematic time-frequency diagram illustrating another determination of a TPC command duration according to some embodiments of the present disclosure.

As shown in FIG. 7, reference sign 710 shows the case of a downlink, and reference sign 720 shows the case of an uplink. Reference sign 711 shows a first downlink control channel such as a PDCCH triggering a previous AP RS, the first downlink control channel being in slot m, m is an integer. For example, $0 \leq m \leq 159$. For another example, $0 \leq m \leq 2559$. According to the configured offset in RRC (for example, O1, and O1 is an integer. For example, $0 \leq O1 \leq 32$. For another example, $0 \leq O1 \leq 256$), the previous AP RS will be communicated in slot m+O1 as denoted by 721. Reference sign 712 shows a second downlink control channel such as a PDCCH triggering a current AP RS, the second downlink control channel being in slot n, n is an integer. For example, $0 \leq n \leq 159$. For another example, $0 \leq n \leq 2559$. According to the configured offset in RRC (for example, O2, and O2 is an integer. For example, $0 \leq O2 \leq 32$. For another example, $0 \leq O2 \leq 256$), the current AP RS will be communicated in slot n+O2 as denoted by 722.

Reference sign 713 shows a third downlink control channel such as a PDCCH for slot offset modification, the third downlink control channel being in slot p, p is an integer. For example, $0 \leq p \leq 159$. For another example, $0 \leq p \leq 2559$. In some embodiments, the value of O1 may be same with the value of O2. In some embodiments, the value of O1 may be different from the value of O2. In some embodiments, m may be same with n, or alternatively, slot m and slot n are the same slot. For example, the PDCCH triggering the previous AP RS is in the same slot with the PDCCH triggering the current AP RS. For another example, the last symbol of the PDCCH triggering the previous AP RS is earlier than or no later than the last symbol of the PDCCH triggering the current AP RS. In some embodiments, m may be different with n, or alternatively, slot m and slot n are different slots. For example, the slot for the PDCCH triggering the previous AP RS is different from the slot for the PDCCH triggering the current AP RS. For another example, the slot for the PDCCH triggering the previous AP RS is earlier than or no later than the slot for the PDCCH triggering the current AP RS.

In some embodiments, n+O2 may be different from q. For example, slot n+O2 is earlier than or no later than slot q. In some embodiments, n+O2 may be same with q, or in other words, slot n+O2 is same with slot q. For example, the previous AP RS transmission is later than or no earlier than the current AP RS transmission. For another example, the first and/or the last symbol of the previous AP RS transmission is later than or no later than the first and/or the last symbol of the current AP RS transmission. In some embodiments, m+O1 may be same with n+O2, or alternatively, the slot m+O1 and the slot n+O2 are same slot. For example, the configured timing for the previous AP RS transmission is earlier than or no later than the configured timing for the current AP RS transmission. For another example, the configured timing of the first and/or the last symbol of the previous AP RS transmission is earlier than or no later than the configured timing of the first and/or the last symbol of the current AP RS transmission.

In some embodiments, m+O1 may be different from n+O2, or alternatively, the slot m+O1 is different from the slot n+O2. For example, the configured slot m+O1 for the previous AP RS transmission is earlier than or no later than the configured slot n+O2 for the current AP RS transmission. In some embodiments, the value of p may be different from any one of the value of m and the value of n. For example, the slot p may be no later than slot m or no later than slot n. For another example, the slot p may be no earlier than slot m and no later than slot n. For another example, the slot p may be no earlier than slot m or no earlier than slot n.

In some embodiments, the value of p may be same as the value of m or same as the value of n, or alternatively, the slot p may be same as the slot m or same as the slot n. For example, the last symbol of the PDCCH triggering the previous AP RS is earlier than or no later than the last symbol of the PDCCH for slot offset modification. For another example, the last symbol of the PDCCH triggering the current AP RS is earlier than or no later than the last symbol of the PDCCH for slot offset modification. For another example, the last symbol of the PDCCH triggering the previous AP RS is later than or no earlier than the last symbol of the PDCCH for slot offset modification. For another example, the last symbol of the PDCCH triggering the current AP RS is later than or no earlier than the last symbol of the PDCCH for slot offset modification. For another example, the last symbol of the PDCCH triggering the previous AP RS is earlier than or no later than the last symbol of the PDCCH for slot offset modification, and the last symbol of the PDCCH triggering the current AP RS is later than or no earlier than the last symbol of the PDCCH for slot offset modification.

In some embodiments, the slot m+O1 is unavailable, and based on the slot offset modification, the previous AP RS is adjusted to be communicated in slot q as denoted by 723. In some embodiments, the previous AP RS may be flexibly or dynamically adjusted to be communicated in slot q as denoted by 323. For example, the previous AP RS may be needed to be delayed. It should be noted that the previous AP RS communication may be delayed or advanced.

In this example, the starting timing for TPC command duration may be based on the PDCCH for triggering the previous communication occasion as denoted by 711 (for example, the next symbol starting from the last symbol of the PDCCH for triggering the previous communication occasion), and the ending timing may be based on the PDCCH for slot offset modification as denoted by 713 (for example, the last symbol of the PDCCH for slot offset modification). Thus, the TPC command duration is denoted by 730. In some embodiments, the first or the last symbol of the PDCCH for slot offset modification is at least K symbols before the current communication occasion, K is positive integer, and $1 \leq K \leq 28$. For example, K is predefined. For another example, K is reported by UE capability. For another example, K is configured by the network device. In this way, the original TPC command duration is considered and is enlarged, and thus correct power adjustment can be achieved. For example, the TPC command duration is between the next symbol starting from the last symbol of the PDCCH in slot m (for triggering the previous communication occasion) and the last symbol of the PDCCH in slot p (for slot offset modification).

In some embodiments, the starting timing for TPC command duration may be based on the PDCCH for triggering the current communication occasion as denoted by 712 (for example, the first symbol of the PDCCH for triggering the current communication occasion), and the ending timing may be based on the PDCCH for slot offset modification as denoted by 713 (for example, the last symbol of the PDCCH for slot offset modification). For example, the TPC command duration is between the first symbol of the PDCCH in slot m (for triggering the current communication occasion) and the last symbol of the PDCCH in slot p (for slot offset modification).

Example 3

In some embodiments, the terminal device 120 may determine whether a first downlink resource triggering the first communication is earlier than a third downlink resource triggering the modification and the third downlink resource comprises a power adjustment command for the first communication. If determining that the first downlink resource is earlier than the third downlink resource in a slot and the third downlink resource comprises the power adjustment command, the terminal device 120 may determine a time duration based on the third downlink resource, the first uplink resource and the second uplink resource. Upon determining the time duration, the terminal device 120 may determine the power adjustment information based on the time duration. In some embodiments, the original duration may be first determined based on the first and second uplink resources as described in Example 1, and then the TPC command duration may be count as a sum of the original duration and a duration of the third downlink resource. It will be further described with reference to FIG. 8.

Figure 8:
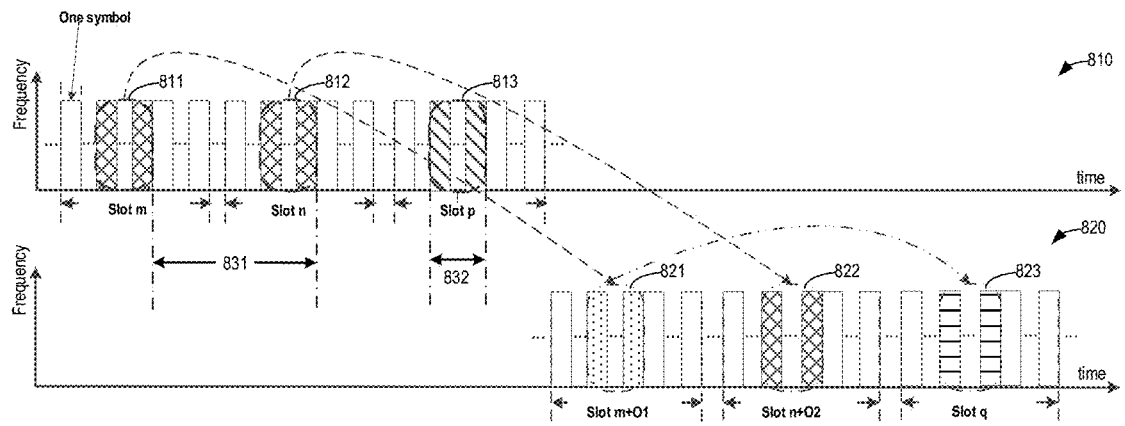
FIG. 8 illustrates a schematic time-frequency diagram illustrating another determination of a TPC command duration according to some embodiments of the present disclosure.

FIG. 8 illustrates a schematic time-frequency diagram illustrating another determination of a TPC command duration according to some embodiments of the present disclosure. As shown in FIG. 8, reference sign 810 shows the case of a downlink, and reference sign 820 shows the case of an uplink. Reference sign 811 shows a first downlink control channel such as a PDCCH triggering a previous AP RS, the first downlink control channel being in slot m, m is an integer. For example, 0≤m≤159. For another example, 0≤m≤2559. According to the configured offset in RRC (for example, O1, and O1 is an integer. For example, 0≤O0≤32. For another example, 0≤O1≤256), the previous AP RS will be communicated in slot m+O1 as denoted by 821.

Reference sign 812 shows a second downlink control channel such as a PDCCH triggering a current AP RS, the second downlink control channel being in slot n, n is an integer. For example, 0≤n≤159. For another example, 0≤n≤2559. According to the configured offset in RRC (for example, O2, and O2 is an integer. For example, 0≤O2≤32. For another example, 0≤O2≤256), the current AP RS will be communicated in slot n+O2 as denoted by 822.

Reference sign 813 shows a third downlink control channel such as a PDCCH for slot offset modification, the third downlink control channel being in slot p, p is an integer. For example, 0≤p≤159. For another example, 0≤p≤2559. In some embodiments, the value of O1 may be same with the value of O2. In some embodiments, the value of O1 may be different from the value of O2. In some embodiments, m may be same with n, or alternatively, slot m and slot n are the same slot. For example, the PDCCH triggering the previous AP RS is in the same slot with the PDCCH triggering the current AP RS. For another example, the last symbol of the PDCCH triggering the previous AP RS is earlier than or no later than the last symbol of the PDCCH triggering the current AP RS. In some embodiments, m may be different with n, or alternatively, slot m and slot n are different slots. For example, the slot for the PDCCH triggering the previous AP RS is different from the slot for the PDCCH triggering the current AP RS. For another example, the slot for the PDCCH triggering the previous AP RS is earlier than or no later than the slot for the PDCCH triggering the current AP RS.

In some embodiments, n+O2 may be different from q. For example, slot n+O2 is earlier than or no later than slot q. In some embodiments, n+O2 may be same with q, or in other words, slot n+O2 is same with slot q. For example, the previous AP RS transmission is later than or no earlier than the current AP RS transmission. For another example, the first and/or the last symbol of the previous AP RS transmission is later than or no later than the first and/or the last symbol of the current AP RS transmission. In some embodiments, m+O1 may be same with n+O2, or alternatively, the slot m+O1 and the slot n+O2 are same slot. For example, the configured timing for the previous AP RS transmission is earlier than or no later than the configured timing for the current AP RS transmission. For another example, the configured timing of the first and/or the last symbol of the previous AP RS transmission is earlier than or no later than the configured timing of the first and/or the last symbol of the current AP RS transmission.

In some embodiments, m+O1 may be different from n+O2, or alternatively, the slot m+O1 is different from the slot n+O2. For example, the configured slot m+O1 for the previous AP RS transmission is earlier than or no later than the configured slot n+O2 for the current AP RS transmission. In some embodiments, the value of p may be different from any one of the value of m and the value of n. For example, the slot p may be no later than slot m or no later than slot n. For another example, the slot p may be no earlier than slot m and no later than slot n. For another example, the slot p may be no earlier than slot m or no earlier than slot n. In some embodiments, the value of p may be same as the value of m or same as the value of n, or alternatively, the slot p may be same as the slot m or same as the slot n. For example, the last symbol of the PDCCH triggering the previous AP RS is earlier than or no later than the last symbol of the PDCCH for slot offset modification. For another example, the last symbol of the PDCCH triggering the current AP RS is earlier than or no later than the last symbol of the PDCCH for slot offset modification. For another example, the last symbol of the PDCCH triggering the previous AP RS is later than or no earlier than the last symbol of the PDCCH for slot offset modification. For another example, the last symbol of the PDCCH triggering the current AP RS is later than or no earlier than the last symbol of the PDCCH for slot offset modification. For another example, the last symbol of the PDCCH triggering the previous AP RS is earlier than or no later than the last symbol of the PDCCH for slot offset modification, and the last symbol of the PDCCH triggering the current AP RS is later than or no earlier than the last symbol of the PDCCH for slot offset modification.

In some embodiments, the slot m+O1 is unavailable, and based on the slot offset modification, the previous AP RS is adjusted to be communicated in slot q as denoted by 823. In some embodiments, the previous AP RS may be flexibly or dynamically adjusted to be communicated in slot q as denoted by 323. For example, the previous AP RS may be needed to be delayed. It should be noted that the previous AP RS communication may be delayed or advanced.

In this example, the original duration may be first determined based on the slot m+O1 configured for the first uplink resource (for example, the next symbol starting from the last symbol of the PDCCH for triggering the previous communication occasion) and the slot n+O2 configured for the second uplink resource (for example, the last symbol of the PDCCH for triggering the current communication occasion), and the TPC command duration may be determined by a sum of the original duration as denoted by 831 and a duration of the PDCCH for slot offset modification as denoted by 832. In this way, the original TPC command duration is considered and is enlarged, and thus correct power adjustment can be achieved. For example, the TPC command duration is a sum of the duration between the next symbol starting from the last symbol of the PDCCH for triggering the AP RS in slot m+O1 and the last symbol of the PDCCH for triggering the AP RS in slot n+O2 and the PDCCH for slot offset modification if the PDCCH includes TPC command for the AP RS.

If determining that the first downlink resource is not earlier than the third downlink resource in a slot or the third downlink resource does not comprise the power adjustment command, the terminal device 120 may determine a time duration based on the first and second uplink resources. In this case, the time duration is the original duration as described in Example 1. In this way, the original TPC command duration is maintained, and thus correct power adjustment can be achieved. For example, the TPC command duration is between the next symbol starting from the last symbol of the PDCCH for triggering the AP RS in slot m+O1 and the last symbol of the PDCCH for triggering the AP RS in slot n+O2.

Example 4

In some embodiments, if determining that the second uplink resource is modified, the terminal device 120 may omit the power adjustment information so that the first communication is performed without power adjustment. In this case, the TPC command for the first communication is omitted. In some embodiments, if the AP RS in slot m+O1 is modified, the accumulation of TPC command is omitted for the AP RS in slot n+O2. For example, the first or last symbol of the transmission of the AP RS in slot m+O1 is modified to be no earlier than or later than the first or last symbol of the transmission of the AP RS in slot n+O2.

So far, the description is made on a determination of power adjustment information upon modification of the previous RS communication. Return to FIG. 5, upon the power adjustment information is determined, at block 530, the terminal device 120 performs the first communication based on the power adjustment information. In some embodiments where the power adjustment information comprises the TPC command duration, the terminal device 120 may sum TPC commands transmitted from the network device 110 within the TPC command duration, and determine a power factor based on the sum, and then adjust a power for the first communication with the power factor. In some embodiments where the power adjustment information is omitted, the terminal device 120 may directly perform the first communication without power adjustment.

With the solution described with reference to FIGS. 5-8, a suitable power control for the current RS communication can be achieved, and a robust communication can be enhanced.

In some embodiments, $$\sum_{m=0}^{c(S_i)-1} \delta_{SRS,b,f,c}(m)$$

is a sum of TPC command values in a set $S_i$ of TPC command values with cardinality $c(S_i)$ that a User Equipment (UE) receives between $K_{SRS}(i-i_0)-1$ symbols before SRS transmission occasion $i-i_0$ and $K_{SRS}(i)$ symbols before SRS transmission occasion i on active uplink (UL) Bandwidth Part (BWP) b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i if SRS transmission occasion $i-i_0$ is not adjusted (or delayed or advanced) or if SRS transmission occasion $i-i_0$ is adjusted (or delayed), and the SRS transmission occasion $i-i_0$ is earlier than SRS transmission occasion i, otherwise $$\sum_{m=0}^{c(S_i)-1} \delta_{SRS,b,f,c}(m)$$

is a sum of TPC command values in a set $S_i$ of TPC command values with cardinality $c(S_i)$ that the UE receives between $K_{SRS}(i-i_0)-1$ symbols before configured SRS transmission occasion $i-i_0$ without SRS transmission adjustment and $K_{SRS}(i)$ symbols before configured SRS transmission occasion i without SRS transmission adjustment on active UL BWP b of carrier f of serving cell c for SRS power control adjustment state, where $i_0>0$ is the smallest integer for which $K_{SRS}(i-i_0)$ symbols before configured SRS transmission occasion $i-i_0$ without SRS transmission adjustment is earlier than $K_{SRS}(i)$ symbols before configured SRS transmission occasion i without SRS transmission adjustment.

In some embodiments, if the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission if SRS transmission is not adjusted (or delayed or advanced) or if SRS transmission occasion $i-i_0$ is adjusted (or delayed), and the SRS transmission occasion $i-i_0$ is earlier than SRS transmission occasion i, otherwise $K_{SRS}(i)$ is a number of symbols for active UL BWP b of carrier f of serving cell c after a last symbol of a corresponding PDCCH triggering the SRS transmission and before a first symbol of the configured SRS transmission without SRS transmission adjustment.

In some embodiments, $$\sum_{m=0}^{c(S_i)-1} \delta_{SRS,b,f,c}(m)$$

is a sum of TPC command values in a set $S_i$ of TPC command values with cardinality $c(S_i)$ that a UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(t)$ symbols before SRS transmission occasion i where the SRS transmission occasion is the configured SRS transmission before adjustment.

In some embodiments, if the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission where the SRS transmission is the configured SRS transmission before adjustment.

Embodiment 2

In this embodiment, a description is made on implementation of a dynamic adjustment for RS communication. For convenience, this embodiment is described below with respect to the modification of the second uplink resource, i.e., adjustment for the previous RS communication. It should be noted that such embodiment also can be applied to modification of the first uplink resource, i.e., adjustment for the current RS communication, and also can be applied to modification of any RS communication.

Figure 9:
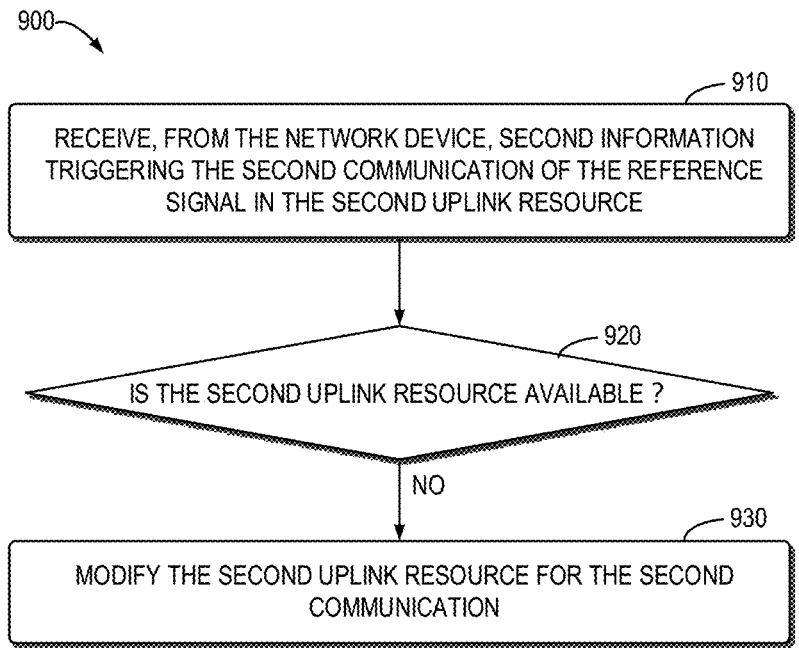
FIG. 9 illustrates an example method of an adjustment for communication of a RS implemented at a terminal device in accordance with some embodiments of the present disclosure.

FIG. 9 illustrates an example method 900 of communication implemented at a terminal device in accordance with some embodiments of the present disclosure. For example, the method 900 may be performed at the terminal device 120 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard.

At block 910, the terminal device 120 may receive, from the network device 110, second information triggering the second communication of the RS in the second uplink resource. For example, the terminal device 120 may receive the second information via a downlink control channel such as the PDCCH as denoted by 612 in FIG. 6, 712 in FIG. 7 or 812 in FIG. 8. In some embodiments, the second information may be DCI. It should be noted that other suitable forms are also feasible.

At block 920, the terminal device 120 may determine whether the second uplink resource is available. In some embodiments, the terminal device 120 may determine whether a slot configured for the second uplink resource is available. If determining that the slot is available, the terminal device 120 may determine the second uplink resource is available. If determining that the slot is unavailable, the terminal device 120 may determine the second uplink resource is unavailable.

In some embodiments where the second uplink resource comprise at least one resource set, the terminal device 120 may determine whether each of at least one slot configured for the at least one resource set is available. In some embodiments, the terminal device 120 may determine the at least one slot based on at least one configured slot offset via a RRC. In some embodiments, the number of the at least one configured slot offset may be equal to the number of the at least one resource set. In some embodiments, the number of the at least one configured slot offset may be smaller than the number of the at least one resource set.

If determining that each of the at least one slot is available, the terminal device 120 may determine the second uplink resource is available. If determining that a first slot of the at least one slot is unavailable, the terminal device 120 may determine the second uplink resource is unavailable. Herein, the first slot is configured for a first resource set of the at least one resource set.

With reference to FIG. 9, if determining that the second uplink resource is unavailable, at block 930, the terminal device 120 may modify the second uplink resource for the second communication. It will be further described with reference to Examples 5-6.

Example 5

In some embodiments, the terminal device 120 may move the second uplink resource to a slot later than the slot configured for the second uplink resource. For example, the second uplink resource may be moved to next available slot. For example, the available slot may be a slot if there are available UL symbol(s) for the configured time-domain location(s) in a slot for all the RS resources in the resource set and if it satisfies the minimum timing requirement between triggering PDCCH and all the RS resources in the resource set. In some embodiments, the terminal device 120 may drop the second uplink resource.

In some embodiments where the second uplink resource comprises at least one resource set and a first slot configured for a first resource set of the at least one resource set is unavailable, the terminal device 120 may move the first resource set to a second slot. In some embodiments, the second slot is an available slot later than the first slot. In some embodiments, the second slot may be next available slot. In some embodiments, the second slot may be next available slot within a timing. A detailed description will be described below with reference to FIG. 10.

Figure 10:
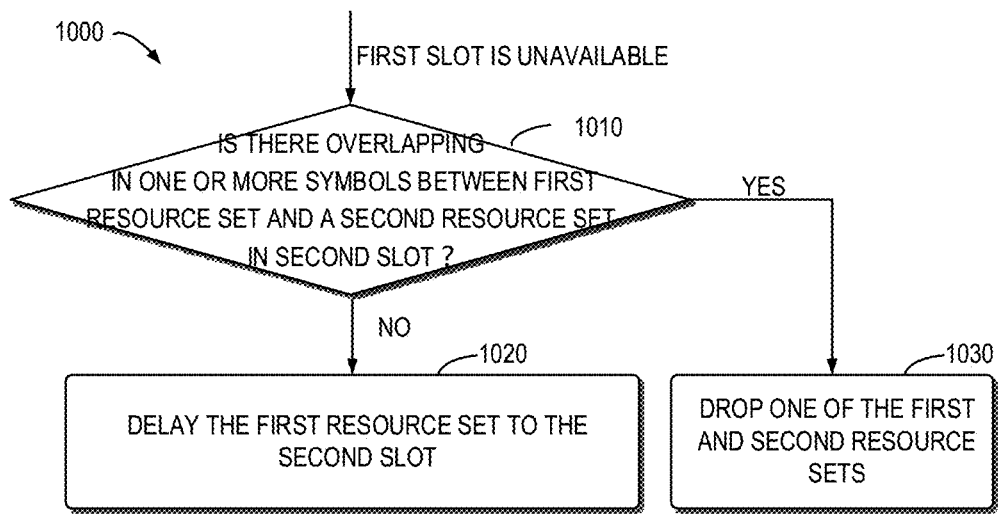
FIG. 10 illustrates an example method of a modification of a RS resource implemented at a terminal device in accordance with some embodiments of the present disclosure.

FIG. 10 illustrates an example method 1000 of a modification of a RS resource implemented at a terminal device in accordance with some embodiments of the present disclosure. For example, the method 1000 may be performed at the terminal device 120 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard.

Upon determining that the first slot is unavailable, at block 1010, the terminal device 110 may determine whether there is overlapping in one or more symbols between the first resource set and a second resource set in a second slot. Herein, the second slot is an available slot later than the first slot. In some embodiments, the second resource set may be one of the at least one resource set. In some embodiments, the second resource set may be one trigged in different timing from the first resource set.

If determining at block 1010 that there is no overlapping, at block 1020, the terminal device 120 may move the first resource set to the second slot. In this way, the second communication will be performed in the second slot. In some embodiments, if there is no the second slot before a timing is expired, the terminal device 120 may drop the first resource set. In some embodiments, the timing may be a configured slot. In some embodiments, the timing may be a predefined slot. It should be noted that any other suitable ways are also feasible for determination of the timing.

If determining at block 1010 that there is overlapping, the process may proceed to block 1030. At block 1030, the terminal device 120 may drop one of the first and second resource set. In some embodiments, the terminal device 120 may drop the modified RS resource, i.e., the first resource set. In some embodiments, the terminal device 120 may drop the whole of the first resource set. In some embodiments, the terminal device 1120 may drop part of the first resource set. For example, the overlapped one or more symbols or resources for the first resource set may be dropped, and the non-overlapped one or more symbols or resources will be transmitted.

In some embodiments, the terminal device 120 may compare the indices of the first and second resource sets, and drop at least part of one of the first and second resource sets except the resource set with a lowest index. For example, only a resource set with lowest resource set ID and/or lowest value of aperiodicSRS-ResourceTrigger or aperiodicSRS-ResourceTriggerList will be transmitted, and the other resource sets will be dropped. Alternatively, only a resource set with lowest resource set ID and/or lowest value of aperiodicSRS-ResourceTrigger or aperiodicSRS-Resource-TriggerList will be transmitted, and the overlapped one or more symbols or resources for the other resource sets will be dropped, and the non-overlapped one or more symbols or resources for the other resource sets will be transmitted.

In some embodiments where there is overlapping, the terminal device 120 may transmit the first and second resource sets in order. For example, the terminal device 120 may transmit the first and second resource sets in increasing order of values for resource set ID or values of aperiodicSRS-ResourceTrigger or values of aperiodicSRS-ResourceTriggerList.

In some embodiments where there is overlapping, the terminal device 120 may move the second resource set to a third slot. Herein, the third slot is an available slot later than the second slot. For example, there is no overlapping of the second resource set with other channel or signal (for example, at least one of PDCCH, PUCCH, SRS, PUSCH, PDSCH) in the third slot. In some alternative embodiments, the terminal device 120 may move the first resource set to the third slot. In some embodiments, if there is no the third slot before a timing is expired, the terminal device 120 may drop the first resource set. In some embodiments, the timing may be a configured slot. In some embodiments, the timing may be a predefined slot. It should be noted that any other suitable ways are also feasible for determination of the timing.

So far, a modification of a RS resource is described in connection with the case that there is no explicit signaling for AP RS communication slot offset indication.

Example 6

Figure 11:
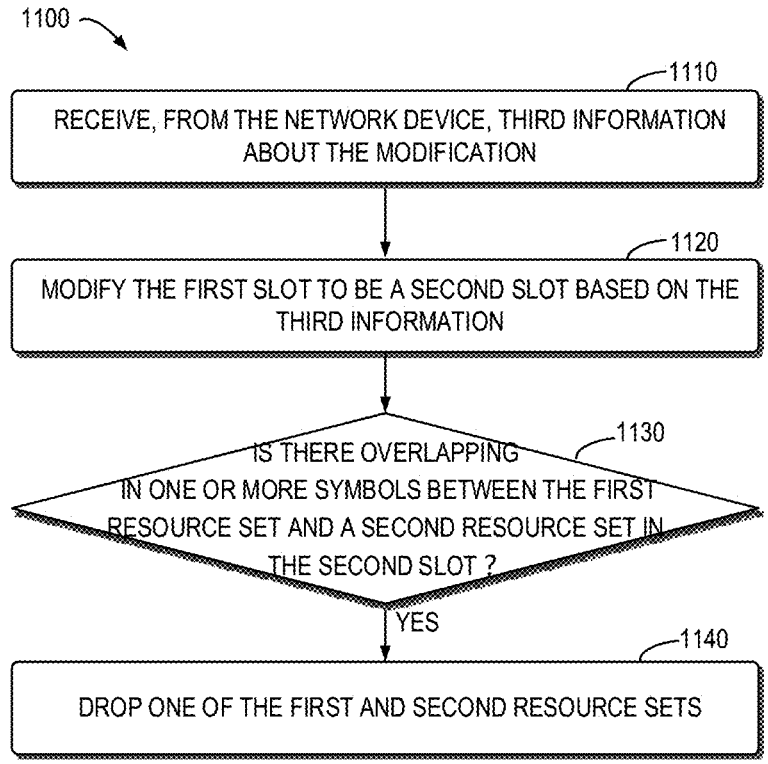
FIG. 11 illustrates another example method of a modification of a RS resource implemented at a terminal device in accordance with some embodiments of the present disclosure.

The following description will be made on a modification of a RS resource for the case that there is an explicit signaling for AP RS communication slot offset indication. In some embodiments, the terminal device 120 may receive, from the network device 110, third information about the modification, and modify the second uplink resource based on the third information. FIG. 11 illustrates another example method 1100 of a modification for a RS resource implemented at a terminal device in accordance with some embodiments of the present disclosure. For example, the method 1100 may be performed at the terminal device 120 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

At block 1110, the terminal device 120 may receive, from the network device 110, third information about the modification. In some embodiments, the third information may be received at the same timing as the reception of the second information. In some embodiments, the third information may be received at a timing later than the reception of the second information. In some embodiments, the third information may be received together with first information triggering the first communication of the RS. In some embodiments, the third information may be received in DCI format 2_0 when a slot format configuration is varied.

In some embodiments where a first slot offset value (for example, the configured offset O1) is configured for the second uplink resource, the third information may comprise a second slot offset value (for example, denoted as O2) different from the first slot offset value. The first and second slot offset values are set with respect to a slot for triggering communication of a RS.

In some embodiments, the first and second slot offset values may be non-negative integers. For example, the first slot offset value $O1 \in \{0, 1, 2 \ldots Omax\}$, and the second slot offset value $O2 \in \{0, 1, 2 \ldots Omax\}$. In some embodiments, maximum offset Omax may be predetermined. In some alternative embodiments, Omax may be configured or pre-configured. In some embodiments, Omax is a positive integer. For example, $1 \leq Omax \leq 512$. For example, Omax may be one of 32, 64, 128, 256 and 512. It should be noted that any other suitable values are also feasible.

In some embodiments, the second slot offset value is above the first slot offset value. In these embodiments, the terminal device 120 may replace the first slot offset value with the second slot offset value and determine the second slot offset value as a final slot offset value for RS resource determination.

In some embodiments, the terminal device 120 may select one of the first and second slot offset values as a final slot offset value. In some embodiments, the terminal device 120 may determine whether a resource determined based on the second slot offset value is available. In some embodiments, the resource determined based on the second slot offset value may be a slot. In some embodiments, the resource or the slot determined based on the second slot offset value is regarded as available if there are available uplink symbol(s) for the configured time-domain location(s) in the resource or in the slot for all the RS resources in the resource set and/or if the resource or the slot satisfies the minimum timing requirement between the triggering information and all the RS resources in the resource set. For example, the terminal device 120 may make the determination depending on its capability. If the resource is available, the terminal device 120 may determine the second slot offset value as the final slot offset value. If the resource is unavailable, the terminal device 120 may determine the first slot offset value as the final slot offset value.

In some embodiments, if the resource determined based on the first slot offset value is available, the terminal device 120 may determine the first slot offset value as the final slot offset value. In some embodiments, if the resource determined based on the first slot offset value is available, and if the resource determined based on the second slot offset value is available, the terminal device 120 may determine the first slot offset value as the final slot offset value. In some embodiments, if the resource determined based on the first slot offset value is unavailable, and if the resource determined based on the second slot offset value is available, the terminal device 120 may determine the second slot offset value as the final slot offset value. In some embodiments, if the resource determined based on the first slot offset value is unavailable, and if the resource determined based on the second slot offset value is unavailable, the terminal device 120 may not transmit or receive the RS.

In some embodiments where a set of first slot offset values are configured for the second uplink resource, the third information may comprise at least one of the following: a subset in the set, and a slot offset value from the set. For example, the set may be denoted as S1, and each element S1' of S1 is a non-negative integer, and $S1' \in \{0, 1, 2 \ldots Omax\}$. In some embodiments, Omax may be predetermined. In some embodiments, Omax may be configured. In some embodiments, Omax is a positive integer. For example, $1 \leq Omax \leq 512$. For example, Omax may be any one of 32, 64, 128, 256 and 512. It should be noted that any other suitable values are also feasible. In some embodiment, the second information may comprise a subset M1, each element M1' of M1 is a non-negative integer and M1'∈S1. In some alternative or additional embodiments, the second information may comprise a value from M1.

In some embodiments, the set S1 may be configured in a RRC message and/or a MAC CE to the terminal device 120, and the number of S1 is N1, N1 is a non-negative integer and 0≤N1≤Omax+1. And one value from the set S1 may be indicated in a DCI. For example, the bit field for DCI may be ceil($\log_2$(N1)) or ceil($\log_2$(Omax+1)).

For example, in some embodiments, the set S1 may be configured in a RRC message to the terminal device 120, and the subset M1 may be activated in a MAC CE and one value from the subset M1 may be indicated in a DCI. In some alternative embodiments, the set S1 may be configured in a RRC message to the terminal device 120, and the number of S1 is N1, N1 is a non-negative integer and 0≤N1≤Omax+1.

In some embodiments a subset of slot offset (e.g. M1, where each value M1' of M1 is non-negative integer, and M1' ∈S1) may be activated in a MAC CE. The number of values in M1 is N2, N2 is a non-negative integer, and 0≤N2≤N1. One value from the set M1 may be indicated in DCI. For example, the bit field for DCI may be ceil($\log_2$(N1)) or ceil(log 2(N2)).

In some embodiments, there may be a number X, and X is a positive integer, and 1≤X≤32. For example, X=2 or 4 or 8 or 16 or 32. In some embodiments, the number X may be predetermined or configured in RRC and/or MAC CE and/or DCI.

In some embodiments where N1 is larger than or equal to X (i.e., N1 X), a subset of slot offset (e.g. M1, where each value M1' of M1 is non-negative integer, and M1' ∈S1) may be activated in a MAC CE. The number of values in M1 is N2, N2 is a non-negative integer, and 0≤N2≤X. One value from the set M1 may be indicated in DCI. For example, the bit field for DCI may be ceil($\log_2$(X)) or ceil($\log_2$(N2)). In some embodiments where N1 is smaller than X (i.e., N1<X), one value from the set S1 may be indicated in DCI, without a MAC CE for activation a subset. For example, the bit field for DCI may be ceil($\log_2$(X)) or ceil($\log_2$(N1)).

In some embodiments where the second uplink resource comprises at least one resource set and at least one first slot offset value (also referred to as a first set of slot offset values herein) are configured for the at least one resource set, the third information may comprise at least one second slot offset value (also referred to as a second set of slot offset values herein). In this case, the terminal device 120 may modify the second uplink resource based on the second set of slot offset values in replacement of the first set of slot offset values. For example, the number of the at least one resource set is denoted as N, N is positive integer and 1≤N≤16. For example, the number of slot offset values in the first set of slot offset values is denoted as M, M is positive integer and 1≤M≤16. For example, the M slot offset values are different to each other. For example, MSN.

In some embodiments, the second set of slot offset values may comprise a set of slot offset values for at least part of the at least one resource set. Here, the part of the at least one resource set is denoted as P resource sets, O≤P≤N. For example, X bits may be set for the field of slot offset update for a single RS resource set, X is positive integer, and 1≤X≤6. In some embodiments, the second set of slot offset values may comprise a slot offset value for each of N resource sets. For example, X bits may be set for the field of slot offset update for a single RS resource set, X is positive integer, and 1≤X≤6. For example, total X*N or X*P bits may be needed. In some embodiments, there may be a field to indicate the index of the RS resource set. For example, Y bits or Y=ceil(log 2(N)) for the field for RS resource set index, Y is positive integer, and 1≤Y≤4. For example, for each of the P RS resource sets, the total number of bits may be X+Y For example, total (X+Y)*N bits or (X+Y)*P bits may be needed.

In some embodiments where a first slot offset value (for example, denoted as O1) is configured for the second uplink resource, the third information may comprise an offset value (for example, denoted as F1) with respect to the first slot offset value. In some embodiments, the offset value F1 may be an integer. For example, −5≤F1≤5, or −2≤F1≤3 or 0≤F1≤10 or −10≤F1≤10. It should be noted that any other suitable values are also feasible.

In some embodiments, the terminal device 120 may determine a final slot offset value based on the first slot offset value O1 and the offset value F1. For example, the final slot offset value may be determined as min (max (A, O1+F1), B) or min(O1+F1, B) or max(A, O1+F1). For example, A is a first value, and A is a non-negative integer, O≤A≤Omax or O≤A≤10. For example, B is a second value, and B is a positive integer, A≤B≤512 or 1≤B≤Omax, or 10≤B≤512. In some embodiments, the first and second values may be predetermined. In some embodiments, the first and second values may be configured or preconfigured. For example, A=0. For example, B=32 or 64. It should be noted that any other suitable values are also feasible for A and B.

In some embodiments, the offset value F1 may be selected from a set of offset values. In some embodiments, an offset value in the set may be associated with at least one of the first slot offset value O1 and a slot format configuration. For example, the number of F1 in the set is Z, Z is a non-negative integer. For example, 0≤Z≤16. The number of F1 (i.e. Z) and/or the available values in F1 (e.g. $F_k$, where 0≤=k<=Z−1) depends on at least one of the value of O1 and slot format configuration.

In some embodiments, for a subset of O1 and/or a subset of slot format configurations, the number of F1 is Zi, and for another subset of O1 and/or another subset of slot format configurations, the number of F1 is Zj, and Zi≠Zj. In some embodiments, for a subset of O1 and/or a subset of slot format configurations, the possible values of F1 is $F_m$, and for another subset of O1 and/or another subset of slot format configurations, the value of possible values of F1 is $F_n$, and there is at least one value in $F_m$, which is different from any one value in $F_n$. In some embodiments, −O1≤F1≤Omax−O1. For example, when O1=0, there is no negative value of F1. For example, when O1=Omax, there is no positive value of F1. In some embodiments, 0≤F1≤Omax or 0≤F1≤Omax−O1 or 1≤F1≤Omax or 1≤F1≤Omax−O1.

In some embodiments, if the configured offset value in RRC is O1, and if the AP RS is triggered in slot n, the number of F1 and/or the possible values in F1 may be determined based on the slots (or slots which can transmit AP RS or available slots) between slot n+O1−A and slot n+O1+B or between slot n+A and slot n+B or between slot n+O1 and slot n+B or between slot n+O1 and slot n+O1+B or between n+A and slot n+O1+B or between slot n and slot n+B or between slot n and slot n+O1+B. For example, A is a non-negative integer. For example, B is a positive integer. In some embodiments, the value of A and/or B may be predetermined or configured via at least one of RRC, MAC-CE and DCI. For example, 0≤A≤5 or 0≤A≤10 or 0≤A≤Omax. For example, 1≤B≤6 or 1≤B≤10 or 1≤B≤Omax. As another example, 0≤A≤O1. As another example, $1 \leq B \leq Omax-O1$. It should be noted that any other suitable values are also feasible for A and B.

In some embodiments, the maximum number or number of F1 may be predetermined or configured via at least one of RRC, MAC-CE and DCI. For example, the maximum number or the number may be H, H is an integer and $0 \leq H \leq 32$. In some embodiments, if the configured offset value in RRC is O1, and if the AP RS is triggered in slot n, the possible/available values in F1 may be determined based on the slots (or slots which can transmit AP RS or available slots) starting from slot n+O1−A or n+A or n+O1 or slot n. For example, the possible/available values in F1 may be determined based on the slots (or slots which can transmit AP RS or available slots) until the number of values in F1 is H. For example, A is a non-negative integer. In some embodiments, the value of A may be predetermined or configured via at least one of RRC, MAC-CE and DCI. For example, $0 \leq A \leq 5$ or $0 \leq A \leq 10$ or $0 \leq A \leq Omax$. It should be noted that any other suitable values are also feasible for A.

In some embodiments, if the AP RS is triggered in slot n, the number of F1 and/or the possible values in F1 may be determined based on the slots (or slots which can transmit AP RS or available slots) between slot n+A and slot n+B, where A is a non-negative integer and B is a positive integer. In some embodiments, the value of A and/or B may be predetermined or configured via at least one of RRC, MAC-CE and DCI. For example, $0 \leq A \leq 5$ or $0 \leq A \leq 10$ or $0 \leq A \leq 32$. For example, $1 \leq B \leq 32$ or $1 \leq B \leq 512$. For example, $A \leq B$. It should be noted that any other suitable values are also feasible for A and B.

In some embodiments where the second uplink resource comprises at least one resource set and a first set of slot offset values for the at least one resource set is configured for the second uplink resource, the third information may comprise a set of offset values with respect to the first set of slot offset values. In this case, the terminal device 120 may modify the second uplink resource based on the set of offset values and the first set of slot offset values. For example, the number of the at least one resource set is denoted as N, N is positive integer and $1 \leq N \leq 16$. For example, the number of slot offset values in the first set of slot offset values is denoted as M, M is positive integer and $1 \leq M \leq 16$. For example, the M slot offset values are different to each other. For example, MSN.

In some embodiments, the set of offset values may be set with respect to at least part of slot offset values in the first set of slot offset values. Here, the part of the slot offset values is denoted as Q slot offset values, $0 \leq Q \leq M$. For example, X bits may be set for the field of slot offset update for a single RS resource set, X is positive integer, and $1 \leq X \leq 6$. In some embodiments, the set of offset values may be set with respect to each of the slot offset values in the first set of slot offset values. For example, X bits may be set for the field of slot offset update for a single RS resource set, X is positive integer, and $1 \leq X \leq 6$. For example, total X*M or X*Q bits may be needed. In some embodiments, there may be a field to indicate the index of the RS resource set. For example, Y bits or Y=ceil(log 2(N)) for the field for RS resource set index, Y is positive integer, and $1 \leq Y \leq 4$. For example, for each of the P RS resource sets, the total number of bits may be X+Y For example, total (X+Y)*M or (X+Y)*Q bits may be needed.

For example, the terminal device 120 may determine a final slot offset value based on the first slot offset value O1 and the offset value F1, and modify the second uplink resource to be in a slot later than the slot of the reception of the second information by the final slot offset value.

In some embodiments, the value of F1 may be an absolute value. That is, the value of F1 is effective in each time of indication. In this case, the final slot offset value may be expressed as O1+F1 or min (max (A, O1+F1), B) or min (O1+F1, B) or max(A, O1+F1). For example, A is a non-negative integer, $0 \leq A \leq Omax$ or $0 \leq A \leq 10$. For example, B is a positive integer, $A \leq B \leq 512$ or $1 \leq B \leq Omax$, or $10 \leq B \leq 512$. In some embodiments, the value of A and/or B may be predetermined. In some embodiments, the value of A and/or B may be configured or preconfigured. For example, A=0. For example, B=32 or 64. It should be noted that any other suitable values are also feasible for A and B.

In some embodiments, the value of F1 may be an accumulated value. In some embodiments, the terminal device 120 may receive, within a predetermined time duration from the reception of the third information, fourth information comprising a further offset value with respect to a sum of the first slot offset value and the offset value. In these embodiments, the terminal device 120 may modify the second uplink resource based on the sum and the further offset value. For example, the final slot offset value may be expressed as $O1+\sum_{i=1}^{L} F1_i$ or min (max (A, $O1+\sum_{i=1}^{L} F1_i$), B) or min($O1+\sum_{i=1}^{L} F1_i$, B) or max(A, $O1+\sum_{i=1}^{L} F1_i$), where $F1_i$ denotes an offset value in ith indication about a modification of the second uplink resource, and L denotes the number of the received indications about the modification. For example, A is a non-negative integer, $0 \leq A \leq Omax$ or $0 \leq A \leq 10$. For example, B is a positive integer, $A \leq B \leq 512$ or $1 \leq B \leq Omax$, or $10 \leq B \leq 512$. In some embodiments, the value of A and/or B may be predetermined. In some embodiments, the value of A and/or B may be configured or preconfigured. For example, A=0. For example, B=32 or 64. It should be noted that any other suitable values are also feasible for A and B.

In this way, an effective or application time of the offset adjustment can be determined. In some embodiments, the value of F1 and/or O2 may be applied after one indication, and effective until next indication. In some alterative embodiments, the indicated value of F1 and/or O2 may be applied to the communication of the AP RS (after the indication), and after the communication of the AP RS, then O1 is assumed until new indication of F1 and/or O2.

In some embodiments, the third information may be transmitted or configured via at least one of RRC, MAC-CE and DCI. Based on the configured offset and/or the third information, a resource R (for example a slot R) may be determined. The terminal device 120 may determine a resource S (for example a slot S) based on the configured offset and/or the third information or based on the resource R for communication of a RS. In some embodiments, the resource S or the slot S may be the first available resource or slot starting from the resource R or the slot R.

In some embodiments, a slot offset O may be transmitted or configured to the terminal device 120. For example, according to some embodiments of the present disclosure, O may be any one of O1, O2, min(max(A, O1+F1), B), min(O1+F1, B), max(A, O1+F1), $O1+\sum_{i=1}^{L} F1_i$, min (max (A, $O1+\sum_{i=1}^{L} F1_i$), B), min($O1+\sum_{i=1}^{L} F1_i$, B), max(A, $O1+\sum_{i=1}^{L} F1_i$), O1−A, −A, O1+A, O1+F1+A, O2+A and A. In some embodiments, the network device may trigger an RS in slot n. For example, n is non-negative integer. For example, $0 \leq n \leq 159$. For another example, $0 \leq n \leq 2559$.

In some embodiments, the terminal device 120 may determine a resource or a slot to transmit the RS. For example, the resource or the slot to transmit the RS is the first (available) uplink resource or first (available) slot for the RS transmission starting from slot n+O or from slot n. In some embodiments, the terminal device 120 may determine a resource or a slot to receive the RS. For example, the resource or the slot to receive the RS is the first (available) downlink resource or first (available) slot for the RS reception starting from slot n+O or from slot n.

In some embodiments, there may be a number G, and G is non-negative integer. For example, $0 \leq G \leq 32$. For another example, $1 \leq G \leq 32$. For example, the value of G may be predefined or configured. For example, the network device may configure or indicate the value of G via at least one of RRC, MAC-CE and DCI. In some embodiments, an index g may be indicated or configured by the network device 110 to the terminal device 120, where g is non-negative integer. For example, $0 \leq g \leq G-1$. For another example, $1 \leq g \leq G$. In some embodiments, the terminal device 120 may determine a resource or a slot to transmit the RS. For example, the resource or the slot to transmit the RS is the g-th or (g+1)-th (available) uplink resource or g-th or (g+1)-th (available) slot or g-th or (g+1)-th slot for the RS transmission starting from slot n+O or from slot n. In some embodiments, the terminal device 120 may determine a resource or a slot to receive the RS. For example, the resource or the slot to receive the RS is the g-th or (g+1)-th (available) downlink resource or g-th or (g+1)-th (available) slot or g-th or (g+1)-th slot for the RS reception starting from slot n+O or from slot n.

For example, $0 \leq g \leq G-1$, and if g=0, the resource or the slot to receive the RS is the first (available) downlink resource or first (available) slot for the RS reception starting from slot n+O or from slot n. For example, $0 \leq g \leq G-1$, and if g=1, the resource or the slot to receive the RS is the second (available) downlink resource or second (available) slot for the RS reception starting from slot n+O or from slot n. For example, $1 \leq g \leq G1$, and if g=1, the resource or the slot to receive the RS is the first (available) downlink resource or first (available) slot for the RS reception starting from slot n+O or from slot n. For example, $1 \leq g \leq G$, and if g=2, the resource or the slot to receive the RS is the second (available) downlink resource or second (available) slot for the RS reception starting from slot n+O or from slot n.

For example, $0 \leq g \leq G-1$, and if g=0, the resource or the slot to transmit the RS is the first (available) uplink resource or first (available) slot for the RS transmission starting from slot n+O or from slot n. For example, $0 \leq g \leq G-1$, and if g=1, the resource or the slot to transmit the RS is the second (available) uplink resource or second (available) slot for the RS transmission starting from slot n+O or from slot n. For example, $1 \leq g \leq G1$, and if g=1, the resource or the slot to transmit the RS is the first (available) uplink resource or first (available) slot for the RS transmission starting from slot n+O or from slot n. For example, $1 \leq g \leq G$, and if g=2, the resource or the slot to transmit the RS is the second (available) uplink resource or second (available) slot for the RS transmission starting from slot n+O or from slot n.

In some embodiments, a slot offset V may be transmitted or configured by the network device 110 to the terminal device 120. For example, V may be any one of O1+B, B, O1+F1+B and O2+B. In some embodiments, the network device may trigger an RS in slot n. For example, n is non-negative integer. For example, $0 \leq n \leq 159$. For another example, $0 \leq n \leq 2559$.

In some embodiments, there may be a number G, and G is non-negative integer. For example, $0 \leq G \leq 32$. For another example, $1 \leq G \leq 32$. For example, the value of G may be predefined or configured. For example, the value of G may be configured or indicated via at least one of RRC, MAC-CE and DCI. In some embodiments, an index g may be indicated or configured to the terminal device 120, where g is non-negative integer. For example, $0 \leq g \leq G-1$. For another example, $1 \leq g \leq G$. In some embodiments, the terminal device 120 may determine a resource or a slot to transmit the RS. For example, the resource or the slot to transmit the RS is the g-th or (g+1)-th (available) or min(g, J)-th or min(g−1, J)-th uplink resource or g-th or (g+1)-th or min(g, J)-th or min(g−1, J)-th (available) slot or g-th or (g+1)-th or min(g, J)-th or min(g−1, J)-th slot for the RS transmission between slot n+O and slot n+V or between slot n and slot n+V. In some embodiments, the terminal device may determine a resource or a slot to receive the RS. For example, the resource or the slot to receive the RS is the g-th or (g+1)-th or min(g, J)-th or min(g−1, J)-th (available) downlink resource or g-th or (g+1)-th or min(g, J)-th or min(g−1, J)-th (available) slot or g-th or (g+1)-th or min(g, J)-th or min(g−1, J)-th slot for the RS reception starting between slot n+O and slot n+V or between slot n and slot n+V.

In some embodiments, there may be J (available) downlink or uplink resources or J (available) slots or J slots between slot n+O and slot n+V or between slot n and slot n+V, J is non-negative integer. For example, $0 \leq J \leq 32$. For another example, $1 \leq J \leq 32$. In some embodiments, the value of J may be different from the value of G. For example, J>G. In this case, the first G (available) downlink or uplink resources or the first G (available) slots or the first G slots may be indicated or configured to the terminal device for the RS communication. For another example, J<G. In this case, the indicated value of g may be $0 \leq g \leq J-1$ or $1 \leq g \leq J$. For example, the value of g larger than J may not be indicated or configured to the terminal device. For another example, if the value of g larger than J is indicated or configured to the terminal device, the RS communication may be dropped. For another example, if the value of g larger than J is indicated or configured to the terminal device, the RS communication may be in the J-th (available) slot or the J-th (available) slot or the J-th slot between slot n+O and slot n+V or between slot n and slot n+V.

In some embodiments, there may be more than one SRS resource sets (For example, U SRS resource sets) configured with a same usage, and U is positive integer. For example, $1 \leq U \leq 128$. For another example, $1 \leq U \leq 32$. For example, the usage may be at least one of "non-codebook", "codebook", "antennaSwitching" and "positioning". Each SRS resource set can be configured with a slot offset. And one or more of the U SRS resource sets (For example, W SRS resource sets) may be triggered or configured or indicated to the terminal device, W is positive integer. For example, $1 \leq W \leq 32$. For another example, $1 \leq W \leq 16$. And the terminal device may transmit the W SRS resource sets based on the slot offset configured in the W SRS resource sets.

With reference to FIG. 11, in some embodiments where the second uplink resource comprises at least one resource set and a first slot of at least one slot configured for the at least one resource set is unavailable, at block 1120, the terminal device 120 may modify the first slot to be a second slot based on the third information. Herein, the first slot is configured for a first resource set of the at least one resource set. For example, the terminal device 120 may determine the second slot based on the determined final slot offset value as described above. In some embodiments, the second slot may be later than the first slot. In some embodiments, the second slot may be earlier than the first slot.

At block 1130, the terminal device 120 may determine whether there is overlapping in one or more symbols between the first resource set and a second resource set in the second slot. At block 1140, the terminal device 120 may drop one of the first and second resource sets. The operation of the dropping is similar with that described in connection with block 1030 in FIG. 10, and thus its details are omitted here for concise.

With the solution described with reference to FIGS. 9-11, a dynamic adjustment for RS communication can be achieved and a flexible triggering for a RS communication can be enhanced.

Figure 12:
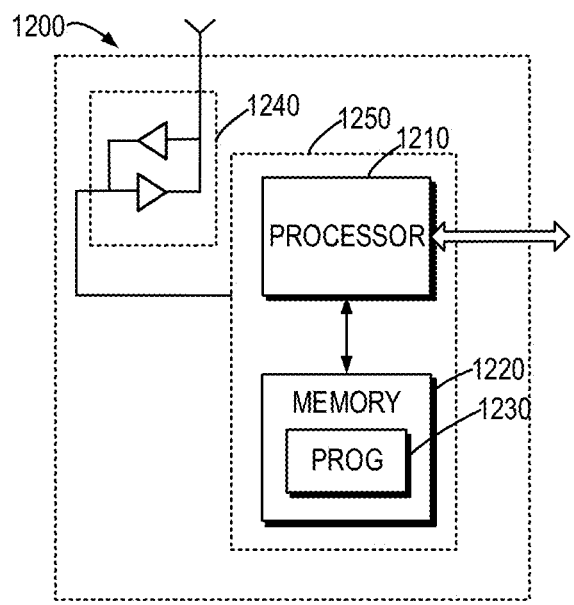
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of the network device 110 or the terminal device 120 as shown in FIG. 1. Accordingly, the device 1200 can be implemented at or as at least a part of the network device 110 or the terminal device 120.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 4 to 11. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1220 may form processing means 1250 adapted to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 4 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
   receiving, from a network device, at least one configuration for an aperiodic sounding reference signal (SRS) resource set,
   wherein the at least one configuration comprises a first slot offset and at least one second slot offset,
   wherein a number of the at least one second slot offset is a positive integer not larger than a first value,
   wherein a candidate value of the at least one second slot offset is a non-negative integer not larger than a second value, and
   wherein a candidate value of the first slot offset is O1, 0<=O1<=32.

2. The method of claim 1, wherein the first value is 4, and the second value is 7.

3. The method of claim 1, wherein the method further comprises:
   receiving, from the network device, a downlink control information (DCI) in a first slot,
      wherein the DCI comprises a bit field indicating a second slot offset among the at least one second slot offset; and
   transmitting, to the network device, an aperiodic SRS in the aperiodic SRS resource set in a second slot,
   wherein the second slot is an available slot counting from a third slot based on the indicated second slot offset, and
   wherein the third slot is determined based on the first slot and the first slot offset.

4. The method of claim 3, wherein a size of the bit field is ceil (log2(N1)), and
   wherein N1 is the number of the at least one second slot offset.

5. A method performed by a network device, the method comprising:
   transmitting, to a terminal device, at least one configuration for an aperiodic sounding reference signal (SRS) resource set,
   wherein the at least one configuration comprises a first slot offset and at least one second slot offset,
   wherein a number of the at least one second slot offset is a positive integer not larger than a first value,
   wherein a candidate value of the at least one second slot offset is a non-negative integer not larger than a second value, and
   wherein a candidate value of the first slot offset is O1, 0<=O1<=32.

6. The method of claim 5, wherein the first value is 4, and the second value is 7.

7. The method of claim 5, wherein the method further comprises:
   transmitting, to the terminal device, a downlink control information (DCI) in a first slot,
      wherein the DCI comprises a bit field indicating a second slot offset among the at least one second slot offset; and
   receiving, from the terminal device, an aperiodic SRS in the aperiodic SRS resource set in a second slot,
   wherein the second slot is an available slot counting from a third slot based on the indicated second slot offset, and
   wherein the third slot is determined based on the first slot and the first slot offset.

8. The method of claim 7, wherein a size of the bit field is ceil (log2(K)), K is the number of the at least one second slot offset.

9. A terminal device, comprising:
   a processor configured to cause the terminal device to:
      receive, from a network device, at least one configuration for an aperiodic sounding reference signal (SRS) resource set,
      wherein the at least one configuration comprises a first slot offset and at least one second slot offset,
      wherein a number of the at least one second slot offset is a positive integer not larger than a first value,
      wherein a candidate value of the at least one second slot offset is a non-negative integer not larger than a second value, and
      wherein a candidate value of the first slot offset is O1, 0<=O1<=32.

10. The terminal device of claim 9, wherein the first value is 4, and the second value is 7.

11. The terminal device of claim 9, wherein the processor is further configured to:
    receive, from the network device, a downlink control information (DCI) in a first slot,
       wherein the DCI comprises a bit field indicating a second slot offset among the at least one second slot offset; and
    transmit, to the network device, an aperiodic SRS in the aperiodic SRS resource set in a second slot,
    wherein the second slot is an available slot counting from a third slot based on the indicated second slot offset, and
    wherein the third slot is determined based on the first slot and the first slot offset.

12. The terminal device of claim 11, wherein a size of the bit field is ceil (log2(N1)), N1 is the number of the at least one second slot offset.

* * * * *